(12) United States Patent
Vey et al.

(10) Patent No.: US 6,641,154 B1
(45) Date of Patent: Nov. 4, 2003

(54) AIR BLADDER SUSPENSION FOR THREE-WHEELED VEHICLE

(76) Inventors: Jeffrey Vey, 22667 FM 15, Troup, TX (US) 75789; Randy Orchard, 5904 Gratiot Rd., St. Clair, MI (US) 48079

( * ) Notice: Subject to any disclaimer, the term of this patent is extended or adjusted under 35 U.S.C. 154(b) by 0 days.

(21) Appl. No.: 09/391,915

(22) Filed: Sep. 9, 1999

(51) Int. Cl.$^7$ ................................................. B60G 9/04
(52) U.S. Cl. ............................ 280/124.157; 280/124.11
(58) Field of Search ....................... 280/124.1, 124.157, 280/124.16, 124.161, 124.11

(56) References Cited

U.S. PATENT DOCUMENTS

| | | | | |
|---|---|---|---|---|
| 2,192,468 A | * | 3/1940 | Gore ............................ | 56/11.3 |
| 3,782,753 A | * | 1/1974 | Sweet et al. ................. | 267/227 |
| 3,980,316 A | * | 9/1976 | Yates ............... | 280/124.157 X |
| 4,372,417 A | * | 2/1983 | Yamamoto et al. ......... | 180/215 |
| 4,483,552 A | * | 11/1984 | Dorscht ............ | 280/124.157 X |
| 4,484,767 A | * | 11/1984 | Klem ................ | 280/124.157 X |
| 4,541,653 A | * | 9/1985 | Raidel ................. | 280/124.109 |
| 4,592,441 A | * | 6/1986 | Marier et al. ............... | 180/217 |
| 4,606,429 A | * | 8/1986 | Kurata ....................... | 180/292 |
| 4,614,247 A | * | 9/1986 | Sullivan ................ | 280/124.11 |
| 4,630,699 A | * | 12/1986 | Yamada et al. ............. | 180/209 |
| 4,730,689 A | * | 3/1988 | Takahashi et al. .......... | 180/215 |
| 4,860,850 A | * | 8/1989 | Takahashi ................... | 180/215 |
| 4,878,691 A | * | 11/1989 | Cooper et al. .... | 280/124.157 X |
| 5,087,073 A | * | 2/1992 | Lund ................ | 280/124.157 X |
| 5,098,119 A | * | 3/1992 | Williams et al. .. | 280/124.157 X |
| 5,265,907 A | * | 11/1993 | Tostado ............ | 280/124.157 X |
| 5,375,880 A | * | 12/1994 | Fleener et al. ........ | 280/124.157 |
| 5,433,285 A | * | 7/1995 | Richards ................. | 280/124.1 |
| 5,632,471 A | * | 5/1997 | Pradel .............. | 280/124.157 X |
| 5,785,345 A | * | 7/1998 | Barlas et al. ........ | 280/124.1 X |
| 6,328,125 B1 | * | 12/2001 | Van Den Brink et al. .. | 180/211 |
| 6,340,165 B1 | * | 1/2002 | Kelderman .......... | 280/124.153 |

OTHER PUBLICATIONS

Declaration of Experimental Use of an Bladder Suspension for Three–Wheeled Vehicle.

* cited by examiner

Primary Examiner—Paul N. Dickson
Assistant Examiner—Toan C To
(74) Attorney, Agent, or Firm—Jones, Walker, Waechter, Poitevent, Carrere & Denegre, LLP

(57) ABSTRACT

An air bladder suspension system for a three-wheeled motorcycle is disclosed herein. The air bladders may be used alone or in combination with an existing suspension system and are positioned between the rear axle housing and rear frame of the three-wheeled motorcycle.

17 Claims, 6 Drawing Sheets

AIR BLADDER SUSPENSION FOR THREE-WHEELED VEHICLE

BACKGROUND OF THE INVENTION

1. Field of the Invention.

This invention relates to suspension systems for three-wheeled motorized vehicles, more particularly an air bladder suspension system.

2. Prior Art.

On most two- and three-wheeled motorcycles, conventional suspension systems provide a smooth ride to the operator. These conventional suspension systems often comprise spring- or air-loaded shocks that connect the frame and the axle. Problems arise, however, when a heavy operator (and perhaps a heavy passenger) sits on the motorcycle. Most conventional suspension systems are not equipped to handle this increased weight and cannot effectively provide a smooth ride. When the motorcycle encounters potholes or bumps, conventional suspension systems cannot handle the increased weight of the operator and passenger, causing the motorcycle to "bottom out."

ADVANTAGES AND OBJECTS OF THE INVENTION

The present invention provides advantages over conventional suspension systems. By using the present invention in combination with an existing conventional suspension system, the three-wheeled motorcycle has an increased weight capacity without concerns that the motorcycle may bottom out. The design of the present air-bladder system allows the amount of air or other fluid in the bladder to vary so that the bladder can adjust to the desires of different users. This design also allows a, user to adjust the amount of air in the bladder(s) to Provide optimum riding conditions on any type of road conditions. The use of the specially designed brackets allows quick and efficient positioning of the bladder (s) between the rear frame and the rear axle housing where most of the weight must be distributed.

With the aforementioned considerations in mind, it is therefore an object of this invention to provide an improved suspension system for three-wheeled motorcycles.

It is a further object of this invention to provide an air-bladder suspension system that may be used in combination with a conventional suspension system.

It is a further object of this invention to provide an adjustable air-bladder suspension system.

It is a further object of this invention to provide an improved suspension system that allows heavier motorcycle operators to ride a three-wheeled motorcycle without concerns about the motorcycle bottoming out.

These and other advantages and objects of this invention shall become apparent from the ensuing description of the invention.

SUMMARY OF THE INVENTION

The invention disclosed herein is a three-wheeled motor vehicle comprising (a) a rear axle housing operatively connectable to a pair of rear wheels, (b) a rear frame connected to the existing frame of the three-wheeled motor vehicle; and, (c) at least one inflatable air bladder operatively positioned between the rear axle housing and the rear frame.

DETAILED DESCRIPTION OF THE EMBODIMENTS OF THE INVENTION

Illustrations of construction, design, and methods of operation of the invention are set forth below with specific references to the Figures. However, it is not intended that the scope of the invention be limited to these embodiments.

Figure 1:
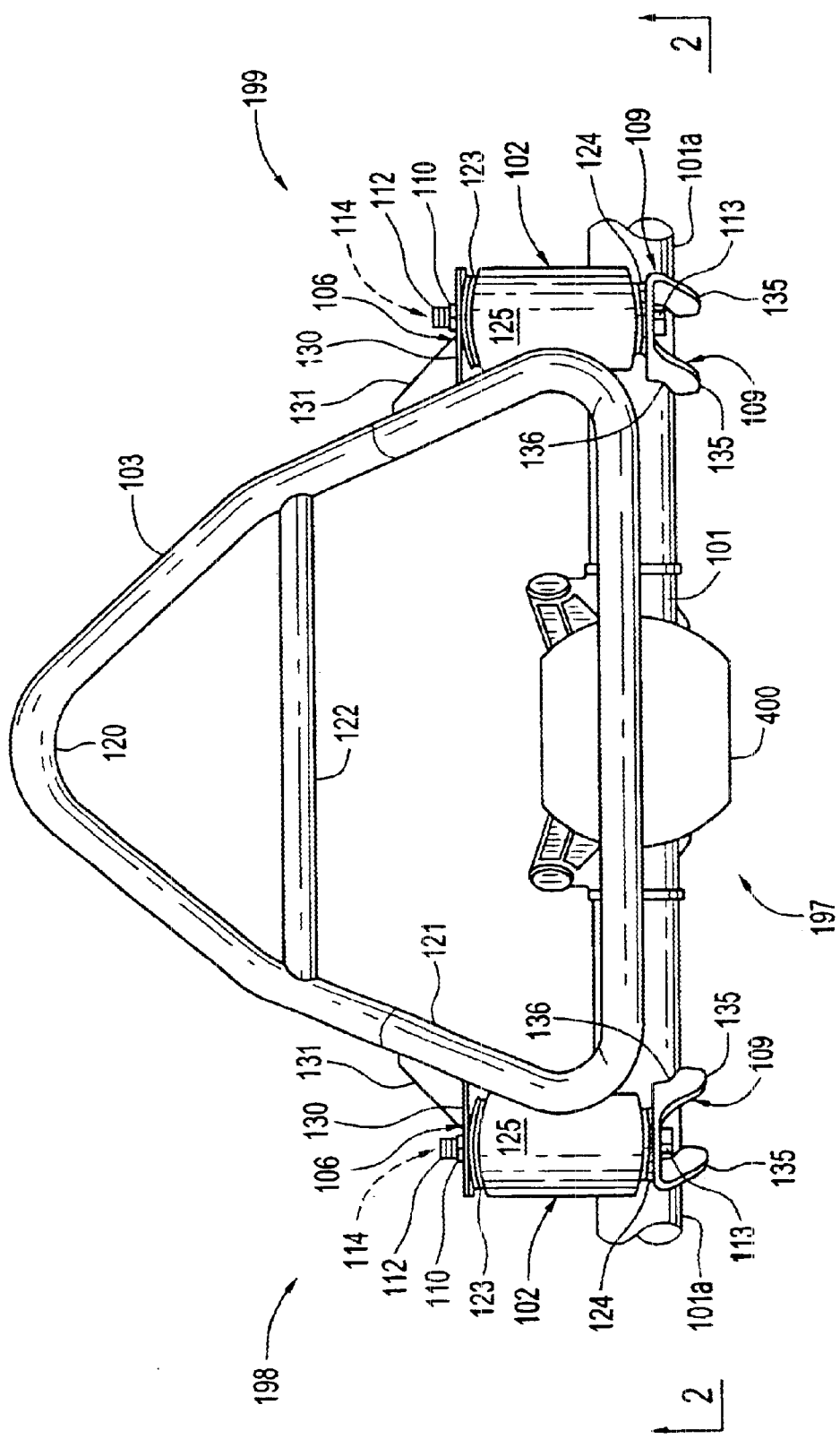
FIG. 1 illustrates a rear view of the rear frame attached to the rear axle housing using the air-bladder suspension system.

As shown in FIG. 1, rear frame 103 attaches to rear axle housing 101 using the air bladder invention 102 positioned on both the left 198 and right side 199 of rear axle housing 101, or other fixed point on axle assembly 197. Rear axle housing 101 may comprise a single or dual axle. As discussed below and shown in FIG. 3a, a shock absorber 300 is also preferably connected between rear frame 103 and rear axle housing 101.

Referring back to FIG. 1, rear frame 103 may comprise a single piece or may comprise multiple interconnected components, such as a lower member 121, an upper member 120 and a cross, member 122. Air bladders 102 connect to rear axle housing 101 using lower brackets 109 and connect to rear frame 103 using upper brackets 106.

Figure 4:
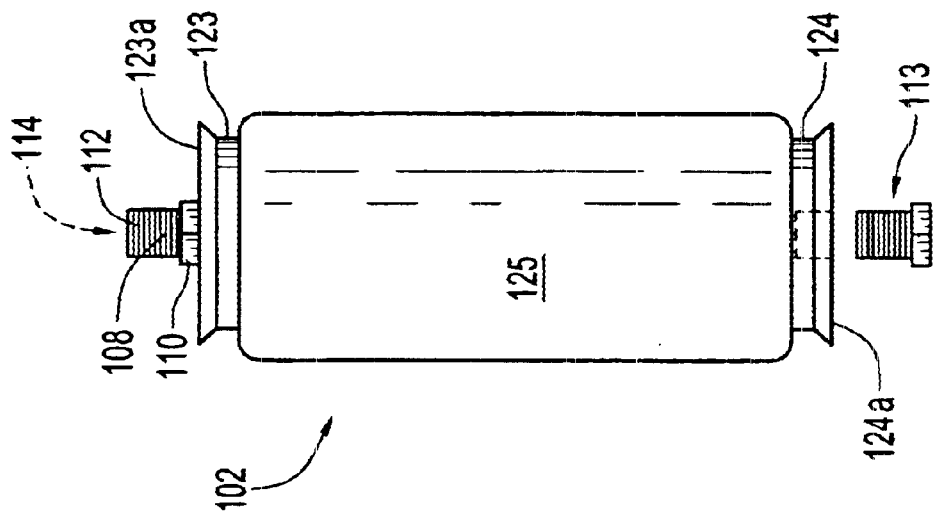
FIG. 4 illustrates a side view of an air bladder.

Referring to FIG. 4, air bladder 102 comprises a compressible tubular member having a sealed upper end 123 and a sealed lower end 124 and at least one compressible sidewall 125 defining an interior volume therein. Lower end 124 is configured to receive a bolt, 113, or other connecting member, that allows air bladder 102 to attach to lower brackets 109 via aperture 116 (shown in FIG. 6). Upper end 123 has a stem 112 attached thereto or configured as part,thereof.

Figure 2:
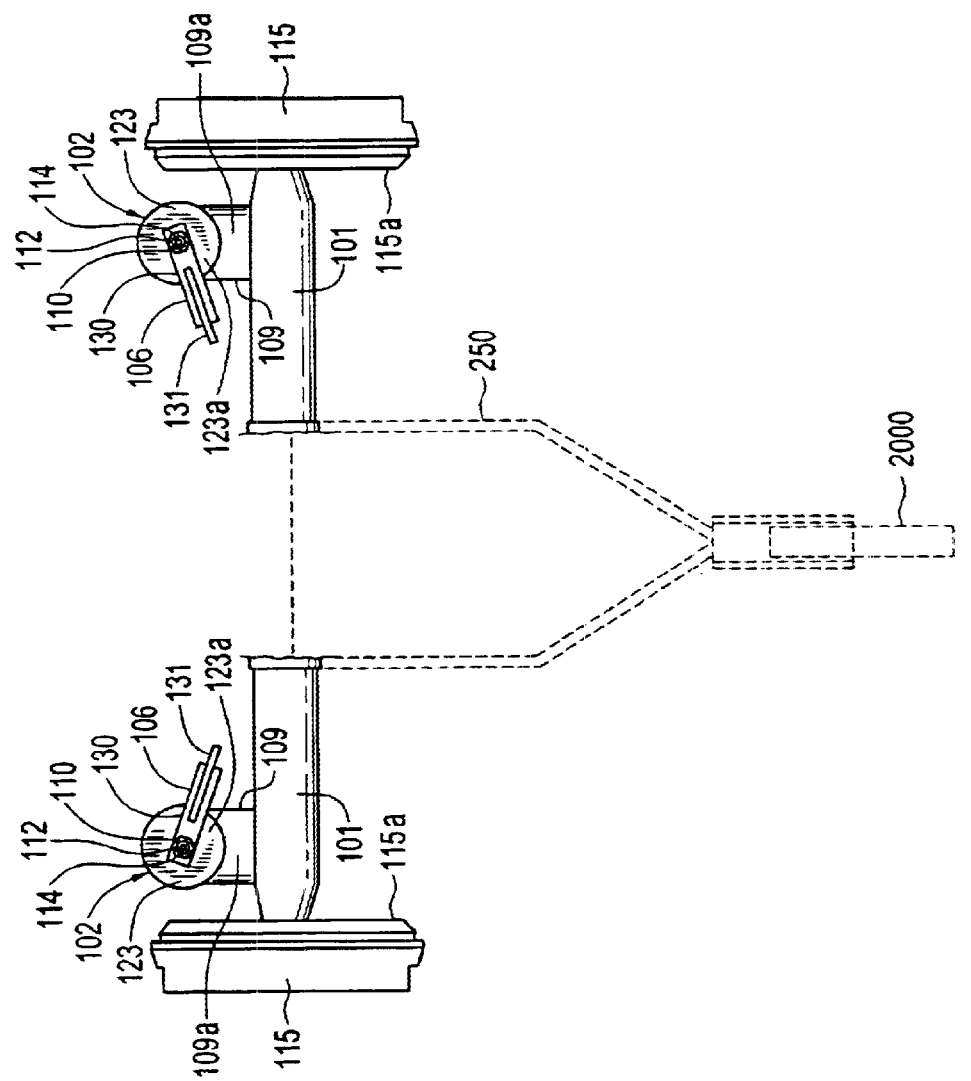
FIG. 2 illustrates a top view of the air-bladder suspension system shown along the 2—2 axis shown in FIG. 1.

Viewing FIG. 2, there are illustrated two rear wheels 115 and a front wheel 2000 connected to an existing motorcycle frame 250 (shown in dashed lines). An air fitting 114, connectable to L-shaped fitting 119 (see FIG. 3a) as discussed below, is positioned within stem 112 as seen in FIG. 2. Viewing FIG. 4, stem 112 has a threaded exterior 108 that allows air bladder 102 to attach to upper brackets 106 via aperture 117 (shown in FIG. 8) using a nut 110 or other suitable means. Air fitting 114 comprises an inlet-outlet aperture extending therethrough which has a check valve positioned therein biased in a normally closed position to allow air bladder 102 to be inflated and deflated. Stem 112 and air fitting 114 are configured so that nut 110 does not restrict access to fitting 114 using L-shaped fitting 119 (shown in FIG. 9) when air bladder 102 is attached to upper bracket 106.

Air bladders 102 are preferably sleeved air springs available from Air Lift Co. of Lansing, Michigan or Goodyear Tire and Rubber Company of Akron, Ohio. Either of the following models is acceptable:

| Model No. | 58182 | 1S3-011 |
|---|---|---|
| Maximum inflated diameter (inches) | 4.6 | 3.6 |
| Minimum height (inches) | 2.2 | 3.6 |
| Maximum height (inches) | 7.1 | 8.0 |
| Load @100 psi (pounds per square inch) | 880 | 415 |

Each model is preferably constructed with a ⅛-inch air fitting 114.

Figure 7:
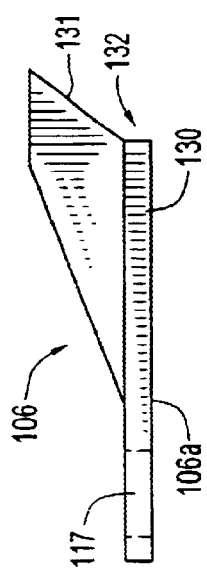
FIG. 7 illustrates a side view of an upper bracket.
Figure 8:
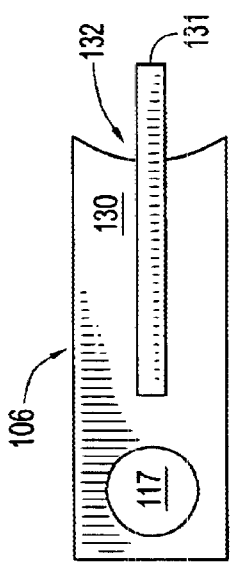
FIG. 8 illustrates a top view of an upper bracket.
Figure 9:
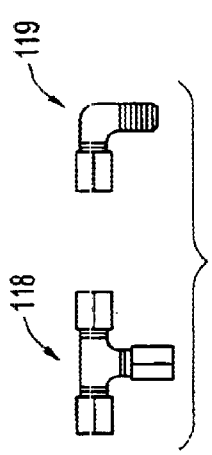
FIG. 9 illustrates side views of the fittings that connect to the fitting on the air bladder.

Upper brackets 106, as shown in FIGS. 7 and 8, may comprise a plate 130 having a gusset 131 attached thereto. An aperture 117 is configured within plate 130 to allow stern 112 to extend through plate 130 so that air bladder 102 attaches to upper bracket 106. Plate 130 has curved portion 132 that engages frame 103 so that upper bracket 106 connects to rear frame 103, such as by welding. Surface 123a of air bladder 102 and surface 106a of upper bracket 106 are both configured to be substantially planar to provide a tight connection between air bladder 102 and upper bracket 106.

Figure 5:
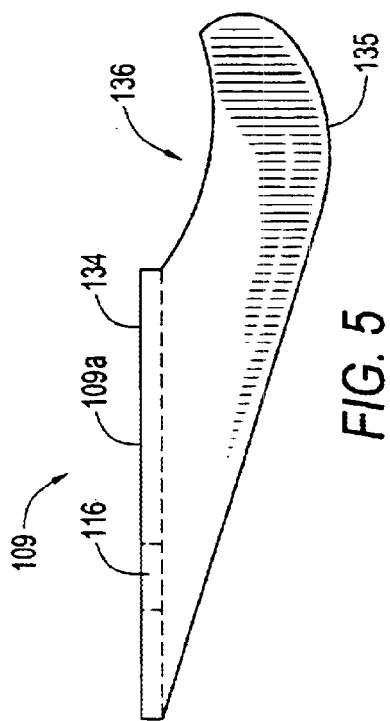
FIG. 5 illustrates a side view of a lower bracket.
Figure 6:
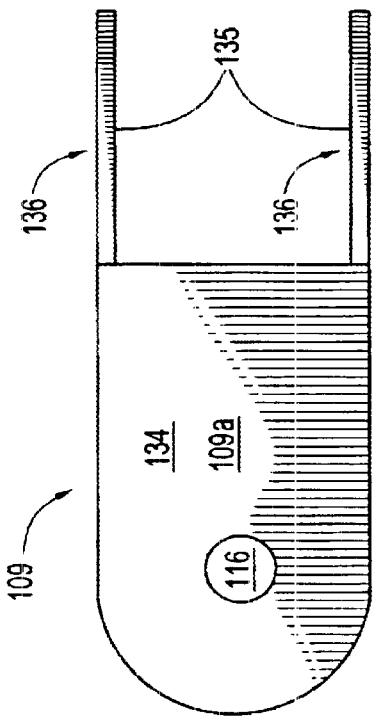
FIG. 6 illustrates a top view of a lower bracket.

Lower brackets 109, as shown in FIGS. 5 and 6, comprise a lower plate 134 having an aperture 116 extending therethrough to allow bolt 113 to extend therethrough to-attach air bladder 102 to lower bracket 109. Lower bracket 109 also comprises a lower bracket gusset 135 having a curved portion 136 that allows lower bracket 109 to engage and attach to the lower side of rear axle housings 101 by welding or other suitable means. Alternatively, lower brackets 109 may be constructed from suitable channeled-angle-iron material. Surface 109a of lower bracket 109 and surface 124a of air bladder 102 are both configured to be substantially planar to provide a substantially tight engagement between air bladder 102 and upper bracket 106.

Viewing FIGS. 1 and 2, air bladders 102 are positioned on either side of the center point of rear axle housing 101. Air bladders 102 may be symmetrically, preferably substantially equidistant from differential 400. Preferably, air bladders 102 are positioned no more than about 6 inches, preferably about 1.5 inches, from the inner edge 115a of wheels 115 as shown in FIG. 2.

Figure 3:
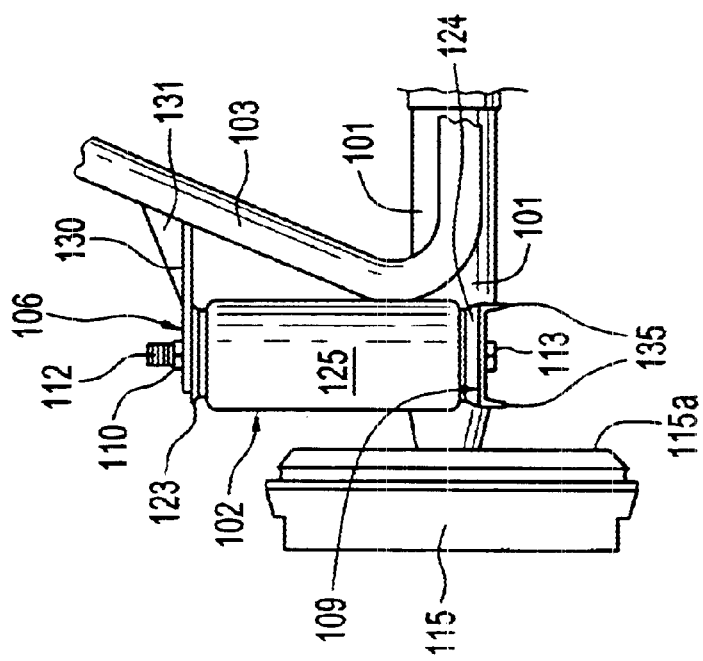
FIG. 3 illustrates a close-up rear view of the air-bladder invention.
Figure 3A:
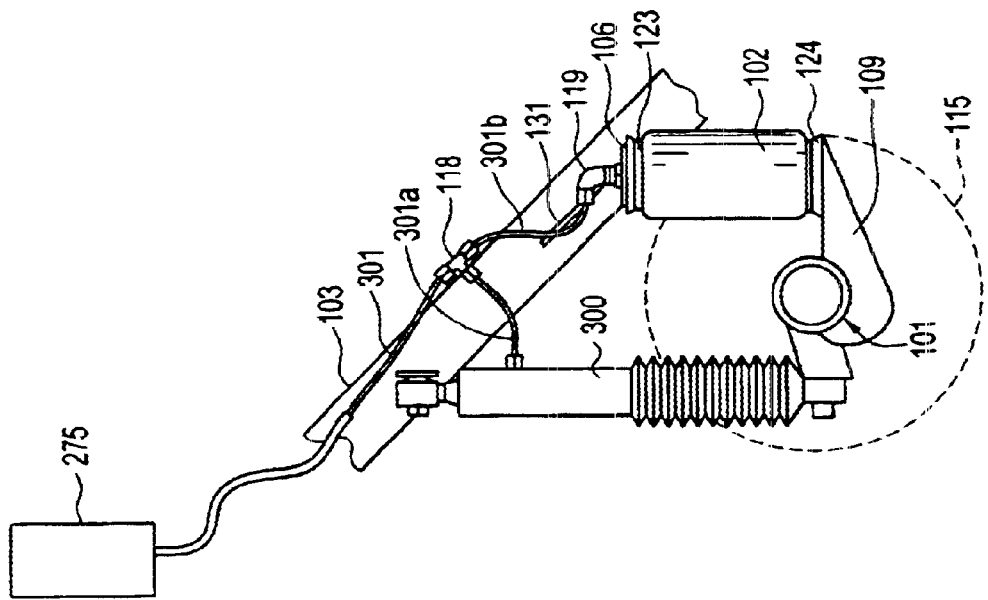
FIG. 3a illustrates a partial side view of the rear portion of a three-wheeled motor vehicle incorporating both shock absorbers and air bladders.

FIG. 3a illustrates a side view of a portion of three-wheeled motorcycle incorporating the present invention. For clarity, wheels 115 are shown removed from rear axle housing 101. An air shock absorber 300, or other conventional shock absorber, attaches between frame 103 and rear axle housing 101. The lower, end of air shock absorber 300 attaches to a bolt extending forward from rear axle housing 101, and the upper end of air shock 300 suitably attaches to frame 103.

Air shock absorber 300 is preferably positioned forward of rear axle housing 101. Air bladders 102 attach between rear frame 103 and rear axle housing 101. Air bladders 102 are positioned behind rear axle housing 101, although air bladder 102 may be positioned forward of rear axle housing 101 in other embodiments not shown in the Figures.

Though not shown in all Figures, each embodiment disclosed herein also incorporates an air line 301 connected to air bladder(s) 102 and/or air shock absorbers 300. The air lines 301 are connected and configured as described below.

Viewing FIG. 3 a, an air line 301 extends from a source of compressed air, such as an on-board air compressor 275, to air shock 300 and air bladders 102. This allows the pressure within air bladder 102 and/or air shock absorber 300 to be adjusted after air bladder 102 and shocks 300 have been installed on the motorcycle.

Air line 301 extends from the source of compressed air into T-shaped fitting 118. From T-shaped fitting 118, air line 301a extends into air shock 300, and air line 301b connects to L-shaped fitting 119. For example, if a heavier rider wishes to ride the three-wheeled motorcycle, it may be necessary to increase the air pressure within air bladders 102. On the other hand, if air bladder(s) 102 are over-inflated, the ride will feel stiff and bumpy. Thus, it may be necessary to, deflate air bladder 102 to a desired pressure. Air lines 301 may also be independently connected to air shock absorber 300 and/or air bladder(s) 102, allowing independent adjustment of the air suspension components.

A two air bladder system installs onto a three-wheeled motorcycle as follows. The three-wheeled motorcycle is positioned on a center stand, the rear tires are removed, and the battery is disconnected to avoid shorting any of the motorcycle's electrical components. Lower brackets 109 connect to rear axle housing 101, such as by welding, preferably about 1.5 inches from the inner edge 115a of wheels 115. A deflated air bladder 102 is positioned onto lower bracket 109. Bolt 113 is the inserted through aperture 116 and loosely engaged with lower end 124. Upper bracket 106 is positioned over air bladder 102 by inserting stem 112 through aperture 117 in upper bracket 106. Upper bracket 106 is positioned such that the distance between upper bracket 106 and lower bracket 109 is equal to the fully inflated length of air bladder 102. Upper bracket 106 is welded to frame 103. Nut 110 loosely engages stem 112, which is positioned through aperture 117. This positioning of upper 10 bracket 106 during installation allows air bladder 102 to be inflated without raising the rear end of the motorcycle or making the ride too stiff with only minimum air pressure within bladder(s) 102.

In some embodiments, rear frame 103 may already be equipped with gussets 131. In such embodiments, upper bracket 106 comprises only plate 130, which is welded to gusset 131 during installation.

L-shaped fitting 119 is then attached to air fitting 114 of air bladder 102, and air line 301b is connected between L-shaped fitting 119 and T-shaped fitting 118, which is preferably positioned near air shock 300. Air line 301b connects between T-shaped fitting 118 and air shock 300. Air line 300 connects between T-shaped fitting 118 and a source of compressed air. This configuration allows air shocks 300 and air bladder 102 to operate using the same air system. Nuts 110 and bolts 113 are tightened to provide a substantially tight fit between brackets 106, 109 and air bladder 102.

Recommended air pressures in each air bladder 102 for a two- air bladder system are as follow's:

| 1 Person | 0–7 psi |
|---|---|
| 2 Persons | 7–21 psi |
| With a trailer | 15–30 psi |

Figure 10C:
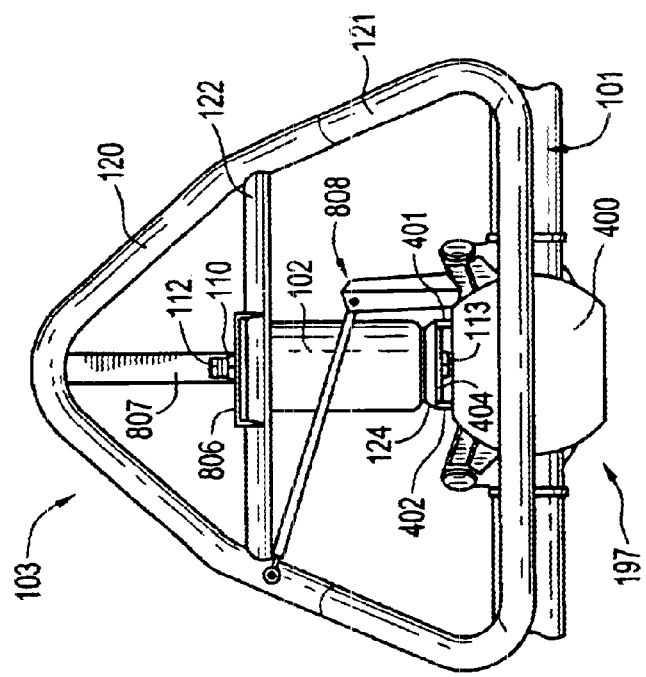
FIGS. 10a–10c illustrate an air bladder suspension system incorporating a single air bladder and a sway bar.
Figure 10B:
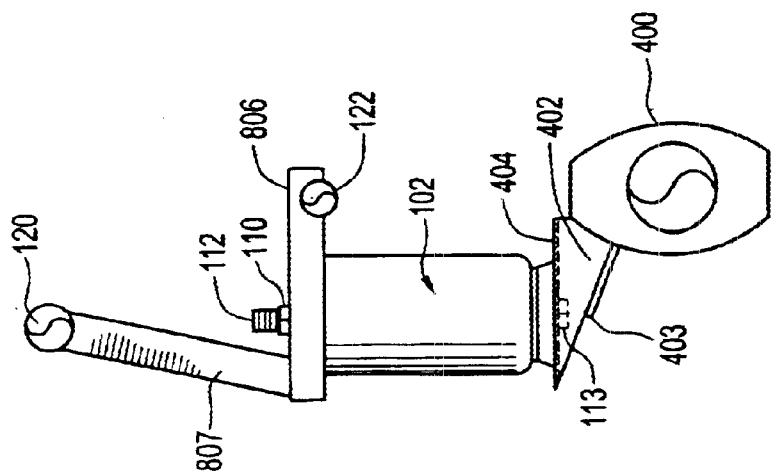
Figure 10A:
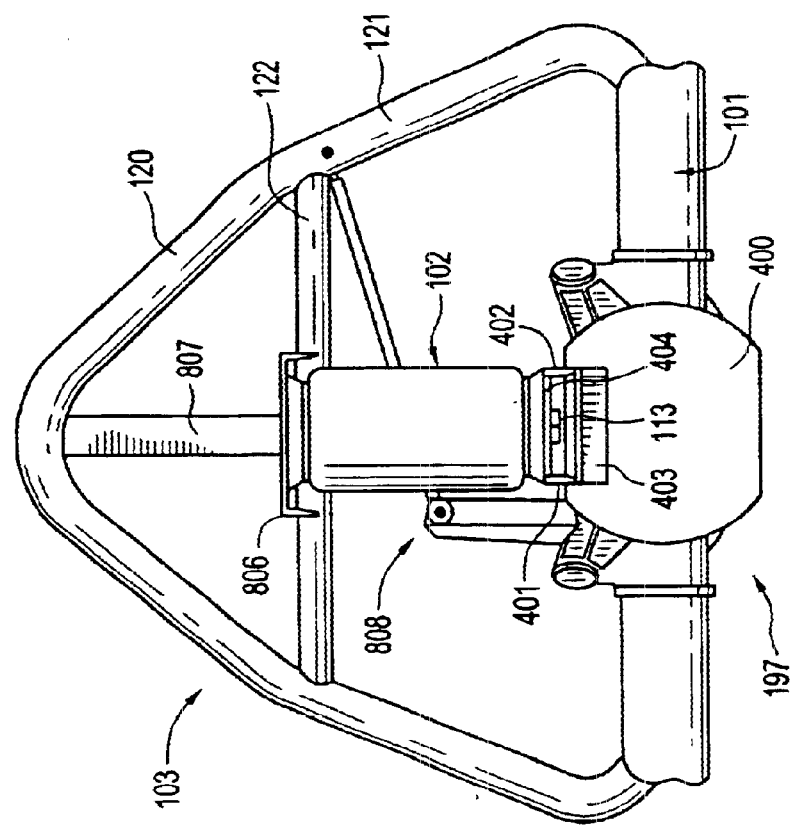

FIGS. 10a–10c illustrate an embodiment incorporating a single air bladder 102. This embodiment comprises an air bladder 102 connected between rear axle housing 101 at differential 400 (or other substantially fixed central point or axle assembly 197) and frame 103 at cross member 122. The single air bladder embodiment is constructed as follows.

Viewing FIGS. 10a–10c, the three-wheeled motorcycle is preferably constructed with left and right ladder bar supports

401, 402 having center reinforcement bar 403 extending therebetween. Supports 401, 402 connect to differential 400, preferably by welding. Referring to FIG. 10a, base plate 404, which has a ½-inch hole drilled therethrough is welded between supports 401, 402 to provide a shelf upon which air bladder 102 is positioned. Bolt 113 inserts through the ½-inch hole in base plate 404 and loosely engages lower end 124 of air bladder 102.

Top plate 806, which is constructed similarly to lower plate 109, connects to cross member 122, preferably by welding. Top plate 806 has a hole therein to allow stem 112 to extend therethrough and allows nut 110 to engage stem 112, connecting-air bladder 102 to top plate 806.

A suitable gusset 807 is welded between top plate 806 and upper frame member 120 to provide additional support and stability to the rear of the motorcycle. A suitable sway bar 808, available from Motor Trike of Troup, Tex., connects between differential 400 and rear frame 103 to stabilize the rear frame and ensure a comfortable ride for the operator. Nut 100 and bolt 113 are tightened, air shock absorber(s) 300 (if applicable) and air bladder 102 are properly inflated, and installation of the air bladder suspension system is complete.

As discussed previously, air bladder 102 connects to a source of compressed air using L-shaped fitting 119 and an air line. The air line may also connect with an air shock which has not been shown in FIGS. 10a–10c but will connect between frame 103 and rear axle housing 101 as previously described.

Although the preferred embodiment has been described, it will be appreciated by those skilled in the art to which the present invention pertains that modifications, changes, and improvements may be made without departing from the spirit of the invention defined by the claims.

We claim:

1. A three-wheeled motorcycle comprising:
    a rear axle housing operatively connectable to a pair of rear wheels;
    a rear frame; and
    at least one inflatable air bladder operatively connected between said rear axle housing and said rear frame and positioned behind said rear axle housing.

2. The three-wheeled motorcycle according to claim 1 further comprising at least one shock absorber connected between said rear axle housing and said rear frame.

3. The three-wheeled motorcycle according to claim 2, further comprising a source of compressed air in fluid communication with said at least one air bladder.

4. A three-wheeled motorcycle comprising:
    a. a three-wheeled motorcycle having a rear axial housing with a differential and said rear axial housing further being operatively connected to a pair of rear wheels;
    b. a rear frame; and
    c. at least one inflatable air bladder operatively positioned between said rear axial housing and said rear frame and behind said rear axle housing.

5. The three-wheeled motorcycle according to claim 4, wherein said air bladder comprises a tubular member having closed ends defining an interior volume, said tubular member having collapsible sidewalls.

6. The three-wheeled motorcycle according to claim 5 further comprising a fitting attached to said bladder having a passageway therethrough whereby pressure within said air bladder may be adjusted.

7. The three-wheeled motorcycle according to claim 5 further comprising a first bracket attaching said air bladder to said rear frame.

8. The three-wheeled motorcycle according to claim 7 further comprising a second bracket attaching said air bladder to said rear axle housing.

9. The three-wheeled motorcycle according to claim 5 comprising two air bladders positioned between said rear frame and said rear axle housing.

10. The three-wheeled motorcycle according to claim 5, further comprising a source of compressed air in fluid communication with said at least one air bladder.

11. The three-wheeled motorcycle according to claim 4 further comprising at least one shock absorber connected between said rear axle housing and said rear frame.

12. A three-wheeled motorcycle comprising:
    a. a rear axial housing having a differential and being operatively connected to a pair of rear wheels;
    b. a rear frame;
    c. at least one inflatable air bladder operatively connected between said rear axial housing and said rear frame and positioned behind said rear axle housing; and
    d. at least one shock absorber connected between said rear axle housing and said rear frame.

13. The three-wheeled motorcycle according to claim 12, wherein said shock absorber in an air shock absorber.

14. The three-wheeled motorcycle according to claim 12, wherein said air bladder comprises a tubular member having closed ends defining an interior volume, said tubular member having collapsible sidewalls.

15. The three-wheeled motorcycle according to claim 14 further comprising a fitting attached to said bladder having a passageway therethrough whereby pressure within said air bladder may be adjusted.

16. The three-wheeled motorcycle according to claim 14 comprising two air bladders positioned between said rear frame and said rear axle housing.

17. The three-wheeled motorcycle according to claim 14, further comprising a source of compressed air in fluid communication with said at least one air bladder.

* * * * *